US012609355B2

(12) United States Patent
Oh et al.

(10) Patent No.: US 12,609,355 B2
(45) Date of Patent: Apr. 21, 2026

(54) ELECTROLYTE FOR LITHIUM SECONDARY BATTERY AND LITHIUM SECONDARY BATTERY INCLUDING THE SAME

(71) Applicant: SK On Co., Ltd., Seoul (KR)

(72) Inventors: Sung Yon Oh, Daejeon (KR); Sang Hye Shin, Daejeon (KR); Min Woo Park, Daejeon (KR)

(73) Assignee: SK On Co., Ltd., Seoul (KR)

( * ) Notice: Subject to any disclaimer, the term of this patent is extended or adjusted under 35 U.S.C. 154(b) by 729 days.

(21) Appl. No.: 17/974,187

(22) Filed: Oct. 26, 2022

(65) Prior Publication Data

US 2023/0130796 A1 Apr. 27, 2023

(30) Foreign Application Priority Data

Oct. 27, 2021 (KR) ........................ 10-2021-0144897

(51) Int. Cl.

| | |
|---|---|
| ***H01M 10/0567*** | (2010.01) |
| ***H01M 4/04*** | (2006.01) |
| ***H01M 4/38*** | (2006.01) |
| ***H01M 4/525*** | (2010.01) |
| ***H01M 10/052*** | (2010.01) |
| ***H01M 10/0568*** | (2010.01) |
| *H01M 4/02* | (2006.01) |

(52) U.S. Cl.

CPC ..... *H01M 10/0567* (2013.01); *H01M 4/0404* (2013.01); *H01M 4/386* (2013.01); *H01M 4/525* (2013.01); *H01M 10/052* (2013.01); *H01M 10/0568* (2013.01); *H01M 2004/027* (2013.01); *H01M 2004/028* (2013.01); *H01M 2300/0037* (2013.01); *H01M 2300/0051* (2013.01)

(58) Field of Classification Search

None

See application file for complete search history.

(56) References Cited

U.S. PATENT DOCUMENTS

2022/0149425 A1 * 5/2022 Park ...................... H01M 4/364

FOREIGN PATENT DOCUMENTS

| | | | | |
|---|---|---|---|---|
| JP | 2009030033 A | 2/2009 | | |
| KR | 100789718 B1 * | 1/2008 | ........ | H01M 10/0567 |
| KR | 1020190035332 A | 4/2019 | | |
| KR | 1020190119615 A | 10/2019 | | |

OTHER PUBLICATIONS

KR 100789718 B1 Machine Translation (Year: 2008).*

* cited by examiner

*Primary Examiner* — Mark Ruthkosky
*Assistant Examiner* — Sarah J Jacobson
(74) *Attorney, Agent, or Firm* — The Webb Law Firm

(57) ABSTRACT

An electrolyte for a lithium secondary battery includes a lithium salt, an organic solvent, and a compound represented by Chemical Formula 1. The compound forms a solid electrolyte interphase on a surface of an anode. A lithium secondary battery including the electrolyte and having improved high-temperature storage properties can be provided.

13 Claims, 1 Drawing Sheet

ELECTROLYTE FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2021-0144897 filed Oct. 27, 2021, the disclosure of which is hereby incorporated by reference in its entirety.

BACKGROUND OF THE INVENTION

Field of the Invention

The present invention relates to an electrolyte for a lithium secondary battery and a lithium secondary battery including the same. More particularly, the present invention relates to an electrolyte for a lithium secondary battery including an organic solvent, a lithium salt and an additive, and a lithium secondary battery including the same.

Description of Related Art

A secondary battery which can be charged and discharged repeatedly has been widely employed as a power source of a mobile electronic device such as a camcorder, a mobile phone, a laptop computer.

A lithium secondary battery is highlighted and developed among various types of secondary batteries due to high operational voltage and energy density per unit weight, a high charging rate, a compact dimension, etc.

For example, the lithium secondary battery may include an electrode assembly including a cathode, an anode and a separation layer, and an electrolyte solution immersing the electrode assembly.

For example, the cathode may include a lithium metal oxide as a cathode active material. The lithium metal oxide may include a transition metal such as nickel, cobalt, or manganese. For example, the anode may include a carbon-based active material, a silicon-based active material, etc., as an anode active material.

The lithium secondary battery may be exposed to a high-temperature environment during repeated charging and discharging and overcharging. In this case, the transition metal may be eluted from the cathode to migrate to a surface of the anode, and loss of an electron in lithium present in the anode may be caused to deteriorate a battery performance.

An anode including the silicon-based active material as the anode active material may provide a high-capacity lithium secondary battery, but a volume expansion may be caused during the repeated charging and discharging to increase a thickness of the battery.

For example, Korean Published Patent Application No. 10-2019-0119615 discloses an additive included in an electrolyte solution for a lithium secondary battery to enhance performance of the lithium secondary battery.

SUMMARY OF THE INVENTION

According to an aspect of the present invention, there is provided an electrolyte for a lithium secondary battery providing improved battery stability and reliability.

According to an aspect of the present invention, there is provided a lithium secondary battery having improved operational stability and reliability.

An electrolyte for a lithium secondary battery includes a lithium salt, an organic solvent, and a compound represented by Chemical Formula 1.

[Chemical Formula 1]

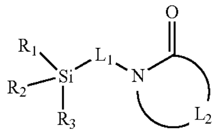

In Chemical Formula 1, $R_1$ to $R_3$ are each independently a substituted or unsubstituted $C_1$-$C_6$ alkyl group, or a substituted or unsubstituted $C_1$-$C_6$ alkoxy group. $L_1$ is a substituted or unsubstituted $C_1$-$C_6$ alkylene group, or a substituted or unsubstituted C2-C6 alkenylene group. $L_2$ is a substituted or unsubstituted $C_3$-$C_5$ alkylene group, or a substituted or unsubstituted $C_3$-$C_5$ alkenylene group.

In some embodiments, $R_1$ to $R_3$ may each be the substituted or unsubstituted $C_1$-$C_3$ alkoxy group, $L_1$ is the substituted or unsubstituted $C_1$-$C_6$ alkylene group, and $L_2$ may each be the substituted or unsubstituted $C_3$-$C_4$ alkylene group.

In some embodiments, the compound represented by Chemical Formula 1 may include a compound represented by Chemical Formula 2.

[Chemical Formula 2]

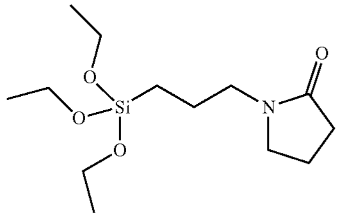

The compound represented by Chemical Formula 1 may be included in an amount ranging from 0.1 wt % to 5 wt % based on a total weight of the electrolyte.

In some embodiments, the electrolyte for a lithium secondary battery may further include an auxiliary additive that includes at least one selected from the group consisting of a fluorine-containing cyclic carbonate-based compound, a fluorine-containing phosphate-based compound, a sultone-based compound, a cyclic sulfate-based compound and a fluorine-containing phosphine-based compound.

In some embodiments, the auxiliary additive may be included in an amount ranging from 1 wt % to 10 wt % based on a total weight of the electrolyte.

In some embodiments, a weight ratio of the auxiliary additive relative to the compound represented by Chemical Formula 1 in the electrolyte may be in a range from 0.5 to 10.

In some embodiments, the organic solvent may include a linear carbonate-based solvent and a cyclic carbonate-based solvent.

A lithium secondary battery includes an electrode assembly including a cathode and an anode facing the cathode, and the electrolyte for a lithium secondary battery according to the above-describe embodiments impregnating the electrode assembly.

In some embodiments, the cathode may include a cathode current collector and a cathode active material layer formed on the cathode current collector, and the cathode active material layer may include a lithium metal oxide containing nickel.

In some embodiments, the anode may include an anode current collector and an anode active material layer formed on the anode current collector, and the anode active material layer may include a silicon-based active material.

In some embodiments, the lithium metal oxide may contain at least 80 mol % of nickel among all elements excluding lithium and oxygen.

In some embodiments, a content of silicon atoms based on a total weight of the anode active material layer may be in a range from 1 wt % to 20 wt %.

An electrolyte for a lithium secondary battery according to exemplary embodiments may form a solid electrolyte interphase (SEI) on a surface of an anode. Accordingly, a lithium secondary battery having improved high-temperature storage properties (e.g., a thickness increase ratio of a battery, a capacity retention, a capacity recovery ratio, etc., at high temperature) may be provided.

A lithium secondary battery according to embodiments of the present invention includes the electrolyte to have improved high-temperature storage properties.

A lithium secondary battery according to exemplary embodiments may include an anode including a silicon-based active material (e.g., Si, SiO, Si/C, etc.) and the electrolyte. Thus, a lithium secondary battery having improved high capacity and high-temperature storage properties may be provided.

DETAILED DESCRIPTION OF THE INVENTION

Figure 1:
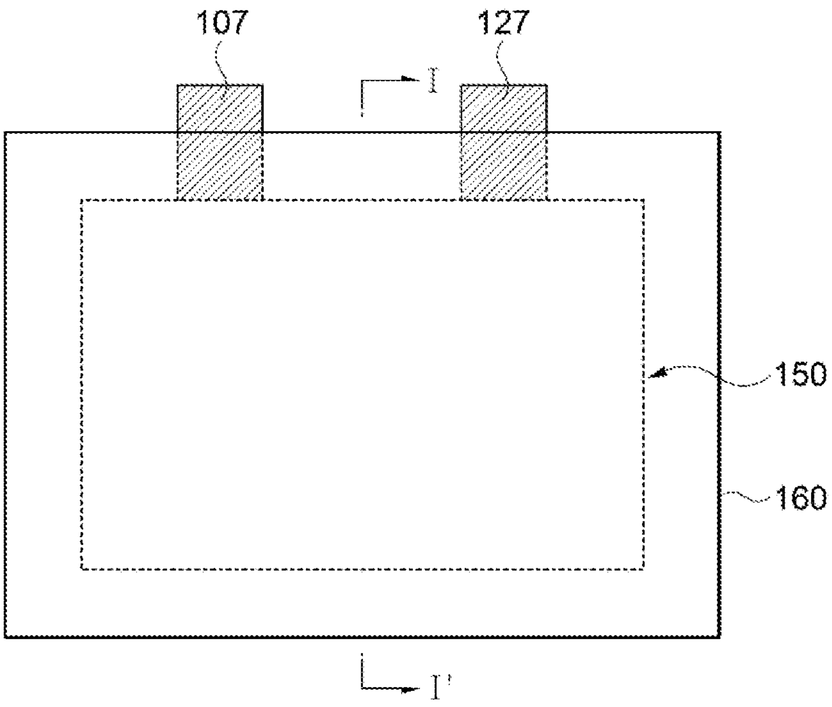
FIGS. 1 and 2 are a schematic plan view and a schematic cross-sectional view, respectively, illustrating a lithium secondary battery in accordance with exemplary embodiments.

The term "Ca-Cb" used herein may indicate that the number of carbon atoms is from a to b.

<Electrolyte for Lithium Secondary Battery>

An electrolyte solution for a lithium secondary battery according to embodiments of the present invention includes an organic solvent, a lithium salt and an additive represented by Chemical Formula 1 below.

[Chemical Formula 1]

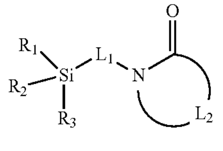

In Chemical Formula 1, $R_1$ to $R_3$ may each independently be a substituted or unsubstituted $C_1$-$C_6$ alkyl group, or a substituted or unsubstituted $C_1$-$C_6$ alkoxy group.

In an embodiment, $L_1$ may be a substituted or unsubstituted $C_1$-$C_6$ alkylene group, or a substituted or unsubstituted C2-$C_6$ alkenylene group.

In an embodiment, $L_2$ may be a substituted or unsubstituted $C_3$-$C_5$ alkylene group, or a substituted or unsubstituted $C_3$-$C_5$ alkenylene group.

For example, $R_1$ to $R_3$, $L_1$ and/or $L_2$ may further include a substituent bonded to a carbon atom. For example, the substituent may be at least one of a halogen, a $C_1$-$C_3$ alkyl group, a $C_2$-$C_3$ alkenyl group, an amino group, a $C_1$-$C_3$ alkoxy group, a $C_3$-$C_7$ cycloalkyl group and a 5-7 membered heterocycloalkyl group.

For example, the electrolyte for a lithium secondary battery may form a solid electrolyte interphase (SEI) stably on the surface of the anode. Accordingly, the battery having improved high-temperature storage properties may be provided. For example, a thickness increase ratio of the lithium secondary battery may be reduced and a capacity retention and a capacity recovery ratio may be improved by the SEI in a high temperature environment.

In some embodiments, $R_1$ to $R_3$ may each independently be a substituted or unsubstituted $C_1$-$C_6$ alkoxy group. Preferably, $R_1$ to $R_3$ may each independently be an unsubstituted $C_1$-$C_3$ alkoxy group. In this case, the high-temperature storage properties of the lithium secondary battery may be further enhanced.

In some embodiments, $L_1$ may be a substituted or unsubstituted $C_1$-$C_6$ alkylene group. Preferably, $L_1$ may be a substituted or unsubstituted $C_2$-$C_4$ alkylene group. More preferably, $L_1$ may be an unsubstituted $C_2$-$C_4$ alkylene group. In this case, the high-temperature storage properties of the lithium secondary battery may be further enhanced.

In some embodiments, $L_2$ may be a substituted or unsubstituted $C_3$-$C_4$ alkylene group. Preferably, $L_2$ may be an unsubstituted $C_3$-$C_4$ alkylene group. In this case, the high-temperature storage properties of the lithium secondary battery may be further enhanced.

In some embodiments, the compound represented by Chemical Formula 1 may include a compound represented by Chemical Formula 2 below. In this case, the high-temperature storage properties of the lithium secondary battery may be further improved. For example, the thickness increase of the battery at the high-temperature environment may be suppressed more effectively.

[Chemical Formula 2]

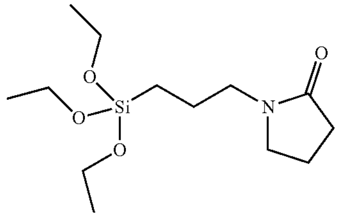

In an embodiment, the compound represented by Chemical Formula 1 may be included in an amount from 0.1 weight percent (wt %) to 5 wt % based on a total weight of the electrolyte.

For example, if the compound represented by Chemical Formula 1 is included in an amount less than 0.1 wt % based on the total weight of the electrolyte, the SEI may not be sufficiently formed on the surface of the anode. Accordingly, the high-temperature storage properties of the lithium secondary battery may not be sufficiently improved.

For example, if the compound represented by Chemical Formula 1 is included in an amount greater than 5 wt % based on the total weight of the electrolyte, a thickness of the SEI may be excessively increased on the surface of the anode. Accordingly, a power of the lithium secondary battery may be degraded.

In an embodiment, the electrolyte may further include an auxiliary additive to improve initial efficiency, life-span and high-temperature storage properties, etc., of the lithium secondary battery.

For example, the auxiliary additive may include a fluorine-containing cyclic carbonate-based compound, a fluorine-containing phosphate-based compound, a sultone-based compound, a cyclic sulfate-based compound, a fluorine-containing phosphine-based compound, etc.

In some embodiments, the auxiliary additive may include the fluorine-containing phosphine-based compound. In this case, the lithium secondary battery may have more improved high-temperature storage properties.

In some embodiments, the auxiliary additive may include at least one selected from the group consisting of the fluorine-containing cyclic carbonate-based compound, the fluorine-containing phosphate-based compound, the sultone-based compound, the cyclic sulfate-based compound and the fluorine-containing phosphine-based compound.

In some embodiments, the auxiliary additive may be included in an amount ranging from 1 wt % to 10 wt % based on the total weight of the electrolyte. Within the above range, the life-span and high-temperature storage properties of the lithium secondary battery may be efficiently improved.

In some embodiments, a weight ratio of the auxiliary additive relative to the compound represented by Chemical Formula 1 in the electrolyte may be 0.5 to 10. Preferably, the weight ratio may be 1 to 5. Within the above range, the life-span and high-temperature storage properties of the lithium secondary battery may be efficiently improved.

For example, a fluorine atom or a fluoroalkyl group (e.g., $-CF_3$) may be bonded to a phosphorus atom in the fluorine-containing phosphine-based compound.

In some embodiments, the fluorine-containing phosphine-based compound may include a difluorine-containing phosphine-based compound.

In some embodiments, a fluorine atom and a C1-C10 alkoxy group may be bonded to a phosphorus atom in the fluorine-containing phosphine-based compound. For example, the fluorine-containing phosphine-based compound may include a $-OPF_2$ group.

In some embodiments, the fluorine-containing phosphine-based compound may include an alkoxy (e.g., $C_1$-$C_{10}$) difluoro phosphine-based compound.

In some embodiments, the fluorine-containing phosphine-based compound may be included in an amount ranging from 0.1 wt % to 2 wt %, from 0.1 wt % to 1.5 wt %, from 0.1 wt % to 1 wt %, or from 0.1 wt % to 0.5 wt % based on the total weight of the electrolyte.

For example, a fluorine atom or a fluoroalkyl group (e.g., $-CF_3$) may be bonded to at least one carbon atom included in the fluorine-containing cyclic carbonate-based compound.

For example, the fluorine-containing cyclic carbonate-based compound may have a 5-7 membered cyclic structure.

In some embodiments, the fluorine-containing cyclic carbonate-based compound may include fluoroethylene carbonate (FEC).

In some embodiments, the fluorine-containing cyclic carbonate-based compound may be included in an amount ranging from 0.1 wt % to 2 wt %, from 0.1 wt % to 1.5 wt %, from 0.1 wt % to 1 wt %, or from 0.1 wt % to 0.5 wt % based on the total weight of the electrolyte.

For example, a fluorine atom or a fluoroalkyl group (e.g., $-CF_3$) may be bonded to a phosphorus atom in the fluorine-containing phosphate-based compound.

In some embodiments, the fluorine-containing phosphate-based compound may include at least one of lithium difluorophosphate ($LiPO_2F_2$), lithium tetrafluorooxalate phosphate and lithium difluoro(bisoxalato)phosphate.

In some embodiments, the fluorine-containing phosphate-based compound may be included in an amount ranging from 0.1 wt % to 2 wt %, from 0.1 wt % to 1.5 wt %, from 0.1 wt % to 1 wt %, or from 0.1 wt % to 0.5 wt % based on the total weight of the electrolyte.

For example, the sultone-based compound may have a 5-7 membered cyclic structure.

In some embodiments, the sultone-based compound may include an alkyl sultone-based compound, an alkenyl sultone-based compound, etc. These may be used alone or in combination thereof.

For example, the alkyl sultone-based compound may have only a saturated bond in a ring, and the alkenyl sultone-based compound may have an unsaturated bond (e.g., a C=C bond) in the ring.

For example, the alkyl sultone-based compound may include at least one of 1,3-propane sultone (PS) and 1,4-butane sultone.

For example, the alkenyl sultone-based compound may include at least one of ethene sultone, 1,3-propene sultone (PRS), 1,4-butene sultone, and 1-methyl-1,3-propene sultone.

In some embodiments, the sultone-based compound may be included in an amount ranging from 0.1 wt % to 2 wt %, from 0.1 wt % to 1.5 wt %, from 0.1 wt % to 1 wt %, or from 0.1 wt % to 0.5 wt % based on the total weight of the electrolyte.

For example, the cyclic sulfate-based compound may have a 5-7 membered cyclic structure.

In some embodiments, the cyclic sulfate-based compound may include at least one of ethylene sulfate (ESA), trimethylene sulfate (TMS) and methyltrimethylene sulfate (MTMS).

In some embodiments, the cyclic sulfate-based compound may be included in an amount ranging from 0.1 wt % to 2 wt %, from 0.1 wt % to 1.5 wt %, from 0.1 wt % to 1 wt %, or from 0.1 wt % to 0.5 wt % based on the total weight of the electrolyte.

The organic solvent may include, e.g., an organic compound having sufficient solubility for the lithium salt, the additive and the auxiliary additive, and may not have reactivity in the battery.

For example, the organic solvent may include a carbonate-based solvent, an ester-based solvent, an ether-based solvent, a ketone-based solvent, an alcohol-based solvent, an aprotic solvent, etc. These may be used alone or in combination thereof.

In an embodiment, the organic solvent may include a carbonate-based solvent.

In some embodiments, the carbonate-based solvent may include a linear carbonate-based solvent and a cyclic carbonate-based solvent.

For example, the linear carbonate-based solvent may include at least one of dimethyl carbonate (DMC), ethyl methyl carbonate (EMC), diethyl carbonate (DEC; diethyl carbonate), methyl propyl carbonate, ethyl propyl carbonate and dipropyl carbonate.

For example, the cyclic carbonate-based solvent may include at least one of ethylene carbonate (EC), propylene carbonate (PC) and butylene carbonate.

In some embodiments, a content of the linear carbonate-based solvent in the organic solvent based on a volume may be equal to or greater than that of the cyclic carbonate-based solvent.

For example, a mixing volume ratio of the linear carbonate-based solvent and the cyclic carbonate-based solvent may be in a range from 1:1 to 9:1, preferably from 1.5:1 to 4:1.

For example, the ester-based solvent may include at least one of methyl acetate (MA), ethyl acetate (EA), n-propyl acetate (n-PA), 1,1-dimethylethyl acetate (DMEA), methyl propionate (MP) and ethyl propionate (EP).

For example, the ether-based solvent may include at least one of dibutyl ether, tetraethylene glycol dimethyl ether (TEGDME), diethylene glycol dimethyl ether (DEGDME), dimethoxyethane, tetrahydrofuran (THF) and 2-methyltetrahydrofuran For example, the ketone-based solvent may include cyclohexanone.

For example, the alcohol-based solvent may include at least one of ethyl alcohol and isopropyl alcohol.

For example, the aprotic solvent may include at least one selected from the group consisting of a nitrile-based solvent, an amide-based solvent (e.g., dimethylformamide), a dioxolane-based solvent (e.g., 1,3-dioxolane) and a sulfolane-based solvent.

The electrolyte may include a lithium salt, and the lithium salt may be represented by $Li^+X^-$.

For example, the anion ($X^-$) of the lithium salt may include at least one of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_{2-}$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

In some embodiments, the lithium salt may include at least one of $LiBF_4$ and $LiPF_6$.

In one embodiment, the lithium salt may be included in a concentration in a range from 0.01 M to 5 M, more preferably, 0.01 M to 2 M with respect to the organic solvent. Within the above concentration range, mobility of lithium ions and/or electrons may be facilitated during charging and discharging of the battery.

<Lithium Secondary Battery>

Figure 2:
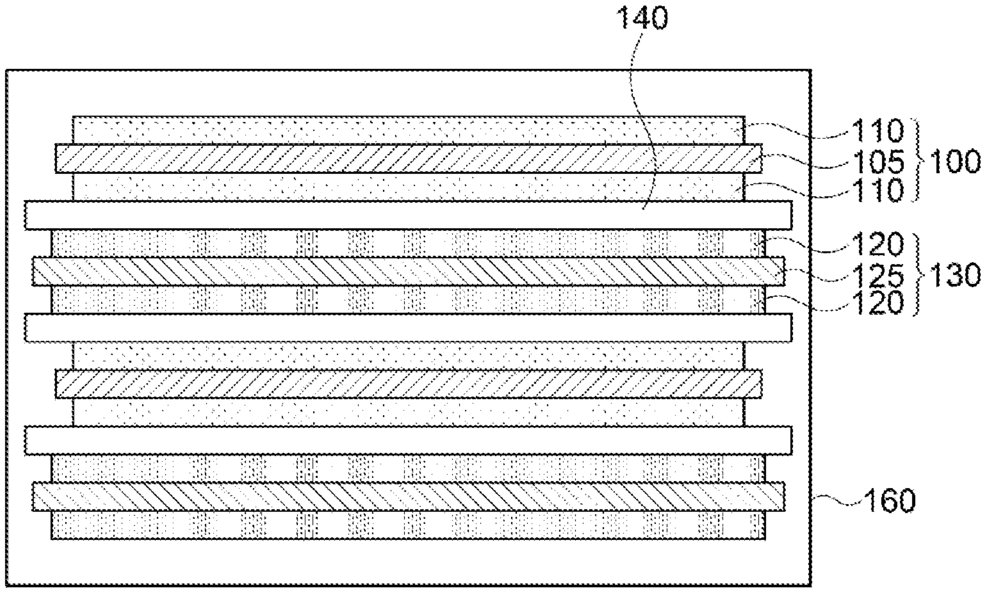

FIGS. 1 and 2 are a schematic top planar view and a schematic cross-sectional view, respectively, illustrating a lithium secondary battery in accordance with exemplary embodiments. Specifically, FIG. 2 is a cross-sectional view taken along a line I-I' of FIG. 1.

Referring to FIGS. 1 and 2, a lithium secondary battery may include a cathode 100 and an anode 130 facing the anode 100.

For example, the cathode 100 may include a cathode current collector 105 and a cathode active material layer 110 formed on the cathode current collector 105.

For example, the cathode active material layer 110 may include a cathode active material, and may further include a cathode binder and a conductive material.

For example, a cathode slurry may be prepared by mixing and stirring the cathode active material, the cathode binder, the conductive material, a dispersive agent, etc. The cathode slurry may be coated on the cathode current collector 105, and then dried and pressed to form the cathode 100.

The cathode current collector 105 may include, e.g., stainless-steel, nickel, aluminum, titanium, copper or an alloy thereof.

For example, the cathode active material may include lithium metal oxide particles capable of reversibly intercalating and de-intercalating lithium ions.

In an embodiment, the cathode active material may include the lithium metal oxide particles containing nickel.

In some embodiments, the lithium metal oxide particles may contain 80 mol % or more of nickel based on a total number of moles of all elements excluding lithium and oxygen. In this case, a lithium secondary battery having a high capacity may be implemented.

In some embodiments, the lithium metal oxide particles may include 83 mol % or more, 85 mol % or more, 90 mol % or more, or 95 mol % or more of nickel based on the total number of moles of all elements excluding lithium and oxygen.

For example, when the lithium secondary battery is exposed to a high-temperature environment, transition metals (e.g., nickel, cobalt, manganese) in the lithium metal oxide particles may be eluted and migrated to a surface of the anode, and electrons from lithium in the anode may be lost by the transition metals. Thus, performance of the secondary battery may be degraded.

For example, as the nickel content in the lithium metal oxide particles increases, the elution of the metals may be easily caused, and the performance of the lithium secondary battery may be further degraded. However, the electrolyte solution for a lithium secondary battery according to the above-described exemplary embodiments may be used so that the degradation of the performance of the lithium secondary battery may be prevented.

In some embodiments, the lithium metal oxide particles may further include at least one of cobalt and manganese.

In some embodiments, the lithium metal oxide particles may further include cobalt and manganese. In this case, the lithium secondary battery having enhanced power and penetration stability may be implemented.

For example, the lithium metal oxide may be represented by Chemical Formula 4 below.

$$Li_xNi_{(1-a-b)}Co_aM_bO_y \quad \text{[Chemical Formula 4]}$$

For example, in Chemical Formula 4, M may include at least one of Al, Zr, Ti, Cr, B, Mg, Mn, Ba, Si, Y, W and Sr, and $0.9 \le x \le 1.2$, $1.9 \le y \le 2.1$, and $0 \le a+b \le 0.5$.

In some embodiments, in Chemical Formula 4, $0<a+b \le 0.4$, $0<a+b \le 0.3$, $0<a+b \le 0.2$, $0<a+b \le 0.17$, $0<a+b \le 0.15$, $0<a+b \le 0.12$, or $0<a+b \le 0.1$.

In one embodiment, the lithium metal oxide particles may further include a coating element or a doping element. For example, the coating element or doping element may include Al, Ti, Ba, Zr, Si, B, Mg, P, Sr, W, La, an alloy thereof, or an oxide thereof. In this case, the lithium secondary battery having more improved life-span properties may be achieved.

For example, the cathode binder may include an organic based binder such as polyvinylidenefluoride (PVDF), a polyvinylidene fluoride-hexafluoropropylene copolymer (PVDF-co-HFP), polyacrylonitrile, polymethylmethacrylate, etc., or an aqueous based binder such as styrene-butadiene rubber (SBR) that may be used with a thickener such as carboxymethyl cellulose (CMC).

The conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode current collector 125 and an anode active material layer 120 on the anode current collector 125.

The anode active material layer 120 may include an anode active material, may further include an anode binder and a conductive material.

For example, the anode active material may be mixed and stirred together with the anode binder, the conductive material in a solvent to form an anode slurry. The anode slurry may be coated on the anode current collector 125, dried and pressed to obtain the anode 130.

For example. the anode current collector 125 may include gold, stainless-steel, nickel, aluminum, titanium, copper or an alloy thereof, preferably, may include copper or a copper alloy.

The anode active material may include a material which may be capable of adsorbing and ejecting lithium ions. For example, the anode active material may include a lithium alloy, a carbon-based material, a silicon-based material, etc.

For example, the lithium alloy may include a metal element such as aluminum, zinc, bismuth, cadmium, antimony, silicon, lead, tin, gallium, indium, etc.

For example, the carbon-based active material may include a crystalline carbon, an amorphous carbon, a carbon complex, a carbon fiber, etc.

The amorphous carbon may include, e.g., a hard carbon, cokes, a mesocarbon microbead (MCMB) fired at a temperature of 1500° C. or less, a mesophase pitch-based carbon fiber (MPCF), etc. These may be used alone or in a combination thereof.

The crystalline carbon may include, e.g., an artificial graphite, natural graphite, graphitized cokes, graphitized MCMB, graphitized MPCF, etc. These may be used alone or in a combination thereof.

In an embodiment, the anode active material may include the silicon-based active material. The silicon-based active material may include, e.g., Si, $SiO_x$(0<x<2), Si/C, SiO/C, Si-metal, etc. In this case, the lithium secondary battery having a high capacity may be implemented.

For example, when the anode active material includes the silicon-based active material, a battery thickness may be increased due to a volume expansion of the silicon-based active material during repeated charging and discharging. However, the electrolyte for a lithium secondary battery according to the above-described exemplary embodiments may be employed so that the increase of the thickness of the lithium secondary battery may be suppressed or alleviated.

In some embodiments, a content of silicon atoms in the anode active material may be 1 wt % or more, 3 wt % or more, 5 wt % or more, 7 wt % or more, or 10 wt % or more.

In some embodiments, the content of silicon atoms in the anode active material may be 50 wt % or less, 40 wt % or less, 30 wt % or less, or 20 wt % or less.

In some embodiments, the content of silicon atoms in the anode active material may be in a range from 1 wt % to 20 wt %, from 5 wt % to 20 wt %, or from 10 wt % to 20 wt %.

The anode binder and the conductive material substantially the same as or similar to the cathode binder and the conductive material as mentioned above may also be used in the anode. In some embodiments, the anode binder may include, e.g., an aqueous binder such as styrene-butadiene rubber (SBR). Further, the anode binder may be used together with a thickener such as carboxymethyl cellulose (CMC).

A separation layer 140 may be interposed between the cathode 100 and the anode 130.

In some embodiments, an area of the anode 130 may be greater than that of the cathode 100. Thus, lithium ions generated from the cathode 100 may be easily transferred to the anode 130 without a loss by, e.g., precipitation or sedimentation.

The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

An electrode cell may be defined by the cathode 100, the anode 130 and the separation layer 140. For example, a plurality of the electrode cells may be stacked to form an electrode assembly 150. For example, the electrode assembly 150 may be formed by winding, laminating or z-folding the separation layer 140.

The lithium secondary battery according to exemplary embodiments may include a cathode lead 107 connected to the cathode 100 to protrude to an outside of a case 160, and an anode lead 127 connected to the anode 130 to protrude to the outside of the case 160.

For example, the cathode lead 107 may be electrically connected to the cathode current collector 105. The anode lead 130 may be electrically connected to the anode current collector 125.

For example, the cathode current collector 105 may include a protrusion (a cathode tab, not illustrated) at one side thereof. The cathode active material layer 110 may not be formed on the cathode tab. The cathode tab may be integral with the cathode current collector 105 or may be connected to the cathode current collector 105 by, e.g., welding. The cathode current collector 105 and the cathode lead 107 may be electrically connected via the cathode tab.

The anode current collector 125 may include a protrusion (an anode tab, not illustrated) at one side thereof. The anode active material layer 120 may not be formed on the anode tab. The anode tab may be integral with the anode current collector 125 or may be connected to the anode current collector 125 by, e.g., welding. The anode electrode current collector 125 and the anode lead 127 may be electrically connected via the anode tab.

In an embodiment, the electrode assembly 150 may include a plurality of the cathodes and a plurality of the anodes. For example, the cathode and the anode may be alternately arranged, and the separation layer may be interposed between the cathode and the anode. Accordingly, the lithium secondary battery according to an embodiment of the present invention may include a plurality of the cathode tabs and a plurality of the anode tabs protruding from the plurality of the cathodes and the plurality of the anodes, respectively.

In an embodiment, the cathode tabs (or the anode tabs) may be laminated, pressed and welded to form a cathode tab stack (or an anode tab stack). The cathode tab stack may be electrically connected to the cathode lead 107. The anode tab stack may be electrically connected to the anode lead 127.

The electrode assembly 150 may be accommodated together with the electrolyte according to exemplary embodiments in the case 160 to define a lithium secondary battery.

The electrode assembly 150 may be accommodated together with the electrolyte solution according to exemplary embodiments in a case 160 to define a lithium secondary battery.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Preparation Example

A compound represented by Chemical Formula 2 was prepared by the following reaction mechanism.

[Chemical Formula 2]

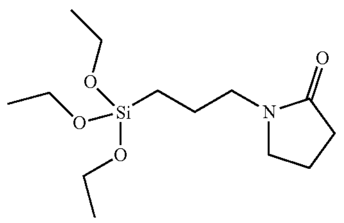

[Reaction Mechanism]

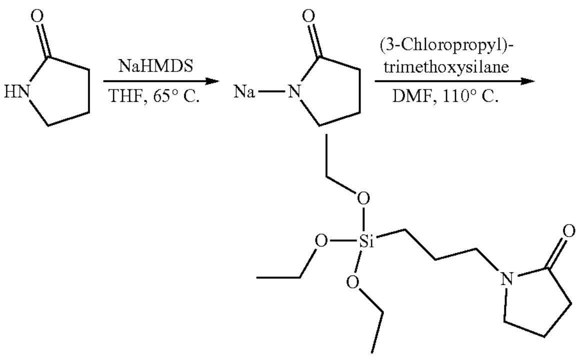

2-pyrrolidone (4 g, 47 mmol) and anhydrous tetrahydrofuran (THF, 50 ml) were added to a reactor to prepare a solution.

The reactor was placed in an ice bath, and then sodium bistrimethylsilylamide (NaHMDS 1.0M in THF, 47.9 ml) was slowly introduced into the reactor under a nitrogen atmosphere over about 1 hour.

After the addition, the ice bath was removed and the reaction was performed by heating at 65° C. under a reflux for 2 hours. THF was removed under reduced pressure, and a powder of sodium pyrrolidone salt (5.03 g) was obtained after vacuum-drying for 8 hours.

The obtained sodium pyrrolidone salt (5.03 g, 47.0 mmol) and N,N-dimethylformamide (DMF, 100 ml) were added to a reactor.

Under a nitrogen atmosphere, 3-chloropropyltrimethoxysilane (11.5 g, 47.9 mmol) was slowly added to the reactor at room temperature over 30 minutes.

After the addition, the reaction was performed by heating at 110° C. for 8 hours. The precipitated sodium chloride (NaCl) was filtrated, and N,N-dimethylformamide (DMF) was removed under reduced pressure.

The compound of Chemical Formula 2 was obtained in a liquid phase by a distillation under reduced pressure (8.5 g, yield 62%).

$^1H$ NMR (500 MHz, DMSO-$d_6$) δ 3.74 (q, 6H), 3.30 (t, 2H), 3.11 (t, 2H), 2.19 (t, 2H), 1.90 (m, 2H), 1.48 (m, 2H), 1.14 (t, 9H), 0.47 (m, 2H).

EXAMPLE AND COMPARATIVE EXAMPLES

Example (1) Preparation of Electrolyte

A 1M $LiPF_6$ solution (EC/EMC mixed solvent by a 25:75 volume ratio) was prepared.

1 wt % of the compound represented by Chemical Formula 2, 2 wt % of fluoroethylene carbonate (FEC), 1 wt % of $LiPO_2F_2$, 0.5 wt % of propane sultone (PS), 0.5 wt % of ethylene sulfate (ESA) and 1 wt % of difluoro(pentyloxy) phosphine were added in the $LiPF_6$ solution based on a total weight of the electrolyte.

(2) Fabrication of Lithium Secondary Battery Sample $Li[Ni_{0.8}Co_{0.1}Mn_{0.1}]O_2$, a carbon black and polyvinylidene fluoride (PVDF) were mixed in NMP by a weight ratio of 92:5:3 to prepare a cathode slurry.

The cathode slurry was uniformly coated on an area excluding a protrusion of an aluminum foil (thickness: 15 μm) having the protrusion (a cathode tab portion) at one side thereof, and then dried and pressed to form a cathode.

An anode slurry was prepared by mixing an anode active material including artificial graphite, natural graphite and SiOx (0<x<2) in a weight ratio of 60:34:6, styrene-butadiene rubber (SBR) and carboxymethyl cellulose (CMC) in a distilled water by a weight ratio of 97:1:2.

The anode slurry was uniformly coated on an area excluding a protrusion of a copper foil (thickness: 15 μm) having the protrusion (an anode tab portion) at one side thereof, and then dried and pressed to form an anode.

An electrode assembly was formed by interposing a polyethylene separator (thickness: 20 μm) between the cathode and the anode. A cathode lead and an anode lead were welded and connected to the cathode tab and the anode tab, respectively.

The electrode assembly was accommodated in a pouch (case) such that portions of the cathode lead and the anode lead were exposed to an outside, and three sides except for an electrolyte injection side were sealed.

The electrolyte prepared in the above (1) was injected, and electrolyte injection side was also sealed to fabricate a lithium secondary battery.

Comparative Example 1

A lithium secondary battery was fabricated by the same method as that in Example, except that the compound of Chemical Formula 2 was not added in the preparation of the electrolyte.

Comparative Example 2

A lithium secondary battery was fabricated by the same method as that in Example, except that 1 wt % of a compound represented by Chemical Formula 3 below was added instead of the compound of Chemical Formula 2 in the preparation of the electrolyte.

[Chemical Formula 3]

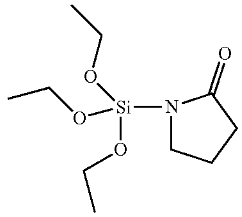

Experimental Example: Evaluation on High-Temperature (60° C.) Storage Property (1) Battery Thickness Increasing Ratio After 0.5 C CC/CV charging (4.2V 0.05 C CUT-OFF) of the lithium secondary batteries of Example and Comparative Examples at 25° C., a battery thickness T1 was measured.

The charged lithium secondary batteries of Example and Comparative Examples were exposed to an air at 60° C. for 3 weeks (using a constant temperature equipment), and then further left at room temperature for 30 minutes. Thereafter, battery thickness T2 was measured.

The battery thickness was measured using a thickness measuring device (Mitutoyo, 543-490B). The battery thickness increasing ratio was calculated as follows.

Battery thickness increasing ratio (%)=$(T2-T1)/T1\times 100$(%)

(2) Capacity Retention

The lithium secondary batteries of Example and Comparative Examples were repeatedly 0.5 C CC/CV charged (4.2V, 0.05 C CUT-OFF) and 0.5 C CC discharged (2.7V CUT-OFF) three times at 25° C., and a discharge capacity at the 3rd cycle was measured.

The lithium secondary batteries of Example and Comparative Examples were charged at 0.5 C CC/CV (4.2V 0.05 C CUT-OFF). The charged lithium secondary batteries were stored at 60° C. for 3 weeks, and further left at room temperature for 30 minutes. Thereafter, a discharge capacity $C_2$ was measured by 0.5 C CC (2.75V CUT-OFF) discharging.

The capacity retention was calculated as follows.

Capacity retention (%)=$C2/C1\times 100$(%)

(3) Capacity Recovery Ratio

After measuring the capacity retention according to the above (2) for the batteries of Example and Comparative Examples, 0.5 C CC/CV charge (4.2V, 0.05 C cut-off) and 0.5 C CC discharge (2.7V cut-off) were performed to measure a discharge capacity $C_3$.

The capacity recovery ratio was calculated as follows.

Capacity recovery ratio (%)=$C3/C1\times 100$(%)

TABLE 1

| | Thickness increasing ratio (%) | Capacity retention (%) | Capacity recovery ratio (%) |
|---|---|---|---|
| Example | 29 | 78 | 79 |
| Comparative Example 1 | 40 | 73 | 74 |
| Comparative Example 2 | 53 | 68 | 70 |

Referring to Table 1, the lithium secondary battery of Example provided reduced thickness increasing ratio and improved capacity retention and capacity recovery ratio compared to those from the lithium secondary batteries of Comparative Examples.

The invention claimed is:

1. An electrolyte for a lithium secondary battery, comprising:

a lithium salt;

an organic solvent; and a compound represented by Chemical Formula 1:

[Chemical Formula 1]

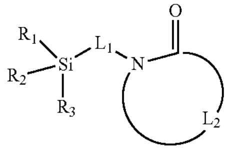

wherein, in Chemical Formula 1, $R_1$ to $R_3$ are each independently a substituted or unsubstituted $C_1$-$C_6$ alkyl group, or a substituted or unsubstituted $C_1$-$C_6$ alkoxy group, $L_1$ is a substituted or unsubstituted $C_2$-$C_6$ alkylene group, or a substituted or unsubstituted $C_2$-$C_6$ alkenylene group, and $L_2$ is a substituted or unsubstituted $C_3$-$C_5$ alkylene group, or a substituted or unsubstituted $C_3$-$C_5$ alkenylene group.

2. The electrolyte for a lithium secondary battery of claim 1, wherein $R_1$ to $R_3$ are each a substituted or unsubstituted $C_1$-$C_3$ alkoxy group, $L_1$ is a substituted or unsubstituted $C_2$-$C_6$ alkylene group, and $L_2$ is a substituted or unsubstituted $C_3$-$C_4$ alkylene group.

3. The electrolyte for a lithium secondary battery of claim 1, wherein the compound represented by Chemical Formula 1 includes a compound represented by Chemical Formula 2:

[Chemical Formula 2]

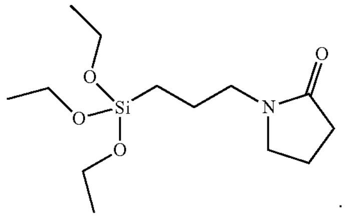

4. The electrolyte for a lithium secondary battery of claim 1, wherein the compound represented by Chemical Formula 1 is included in an amount ranging from 0.1 wt % to 5 wt % based on a total weight of the electrolyte.

5. The electrolyte for a lithium secondary battery of claim 1, further comprising an auxiliary additive that includes at least one selected from the group consisting of a fluorine-containing cyclic carbonate-based compound, a fluorine-containing phosphate-based compound, a sultone-based compound, a cyclic sulfate-based compound and a fluorine-containing phosphine-based compound.

6. The electrolyte for a lithium secondary battery of claim 5, wherein the auxiliary additive is included in an amount ranging from 1 wt % to 10 wt % based on a total weight of the electrolyte.

7. The electrolyte for a lithium secondary battery of claim 5, wherein a weight ratio of the auxiliary additive relative to the compound represented by Chemical Formula 1 in the electrolyte is in a range from 0.5 to 10.

8. The electrolyte for a lithium secondary battery according to claim 1, wherein the organic solvent comprises a linear carbonate-based solvent and a cyclic carbonate-based solvent.

9. A lithium secondary battery, comprising:

an electrode assembly comprising a cathode and an anode facing the cathode; and the electrolyte for a lithium secondary battery according to claim 1 impregnating the electrode assembly.

10. The lithium secondary battery of claim 9, wherein the cathode comprises a cathode current collector and a cathode active material layer formed on the cathode current collector, and the cathode active material layer comprises a lithium metal oxide containing nickel.

11. The lithium secondary battery of claim 9, wherein the anode comprises an anode current collector and an anode active material layer formed on the anode current collector, and the anode active material layer comprises a silicon-based active material.

12. The lithium secondary battery of claim 10, wherein the lithium metal oxide contains at least 80 mol % of nickel among all elements excluding lithium and oxygen.

13. The lithium secondary battery of claim 11, wherein a content of silicon atoms based on a total weight of the anode active material layer is in a range from 1 wt % to 20 wt %.

* * * * *